United States Patent
Dotson

(10) Patent No.: US 8,512,834 B2
(45) Date of Patent: Aug. 20, 2013

(54) POLYURETHANE

(75) Inventor: Michael E. Dotson, Greenville, SC (US)

(73) Assignees: Compagnie Generale des Etablissements Michelin (FR); Michelin Recherche et Technique S. A. (CH)

( * ) Notice: Subject to any disclaimer, the term of this patent is extended or adjusted under 35 U.S.C. 154(b) by 590 days.

(21) Appl. No.: 12/520,285

(22) PCT Filed: Dec. 20, 2007

(86) PCT No.: PCT/US2007/088476
§ 371 (c)(1),
(2), (4) Date: Jun. 19, 2009

(87) PCT Pub. No.: WO2008/077151
PCT Pub. Date: Jun. 26, 2008

(65) Prior Publication Data
US 2010/0047493 A1 Feb. 25, 2010

Related U.S. Application Data

(60) Provisional application No. 60/875,948, filed on Dec. 20, 2006.

(51) Int. Cl.
*C08G 18/00* (2006.01)
*C08G 18/08* (2006.01)

(52) U.S. Cl.
USPC .......... 428/35.7; 525/123; 525/127; 524/588; 524/492; 524/479

(58) Field of Classification Search
USPC ............. 528/373, 374, 65; 428/35.8, 378; 524/588, 492, 479; 525/123, 127; 252/182
See application file for complete search history.

(56) References Cited

U.S. PATENT DOCUMENTS

| | | | | |
|---|---|---|---|---|
| 3,338,861 | A | * | 8/1967 | Mastin et al. ............... 524/848 |
| 3,511,736 | A | * | 5/1970 | Nielsen et al. .............. 428/10 |
| 4,164,251 | A | * | 8/1979 | Chung ....................... 152/323 |

(Continued)

FOREIGN PATENT DOCUMENTS

DE 1098937 * 1/1959

OTHER PUBLICATIONS

Stic search report—Polyurethane with sulfur bridge, search report attached.*
Machine translation of DE1098937.*

(Continued)

*Primary Examiner* — Ellen S Raudenbush
(74) *Attorney, Agent, or Firm* — Frank J. Campigotto

(57) ABSTRACT

A polyurethane that is a reaction product of reaction components, the reaction components comprising (a) a polyol; (b) a polyisocyanate selected from an aromatic, alicyclic or aliphatic polyisocyanate or combinations thereof; (c) a mixture of chain extenders that includes (i) a chain extender having a sulfur bridge in an amount of between 1 and 30 weight percent of the total mixture of claim extenders and (ii) a main chain extender, wherein the chain extender having a sulfur bridge. The chain extender having a sulfur bridge may be characterized as $R_1$-A-$S_x$—B—$R_2$ wherein $R_1$ and $R_2$ are selected from an OH, an $NH_2$ or combinations thereof, A and B are selected from a divalent aliphatic, alicyclic or aromatic organic group or combinations thereof, A and B may be the same or different and x is an integer of between 2 and 10.

21 Claims, 1 Drawing Sheet

(56) References Cited

U.S. PATENT DOCUMENTS

| | | | |
|---|---|---|---|
| 4,235,730 A * | 11/1980 | Schlicht | 508/464 |
| 4,327,152 A | 4/1982 | Miller et al. | |
| 4,347,338 A * | 8/1982 | Torii et al. | 525/123 |
| 4,666,618 A * | 5/1987 | Hentschel et al. | 508/464 |
| 4,737,153 A | 4/1988 | Shimamura et al. | |
| 4,839,204 A * | 6/1989 | Yoshino et al. | 428/35.8 |
| 4,931,487 A * | 6/1990 | Priester et al. | 521/163 |
| 5,217,807 A | 6/1993 | Steiber et al. | |
| 5,391,665 A | 2/1995 | Matsunaga et al. | |
| 5,777,029 A | 7/1998 | Horrion et al. | |
| 6,014,998 A * | 1/2000 | Mowdood et al. | 152/564 |
| 6,337,112 B1 * | 1/2002 | Watanabe et al. | 428/34.7 |
| 6,593,418 B2 * | 7/2003 | Herpich et al. | 524/588 |
| 7,078,104 B2 | 7/2006 | Dunlap | |
| 8,062,709 B2 * | 11/2011 | Jenkines | 427/372.2 |
| 2003/0118837 A1 * | 6/2003 | Modha et al. | 428/423.1 |
| 2005/0165168 A1 | 7/2005 | Park | |
| 2005/0236088 A1 | 10/2005 | Leblond et al. | |
| 2006/0183848 A1 | 8/2006 | Maier et al. | |

OTHER PUBLICATIONS

Flick, E.W. (1998) Industrial Solvents handbook (5th Edition), conversion: glycol mol fraction vs. weight percent.*

Stic search report—Polyurethane with sulfur bridge, search report attached Apr. 2011.*

Machin translation of DE 1098937 Jan. 1959.*

Markusch, Peter H., "Synthesis of Polyurethane Elastomers," Bayer Polymers, Bayer Corporation, Polyurethanes Division, Elastomers Business Group, Pittsburgh, PA,;May 1997.

International Search Report, PCT/US2007/088476, dated May 1, 2008.

* cited by examiner

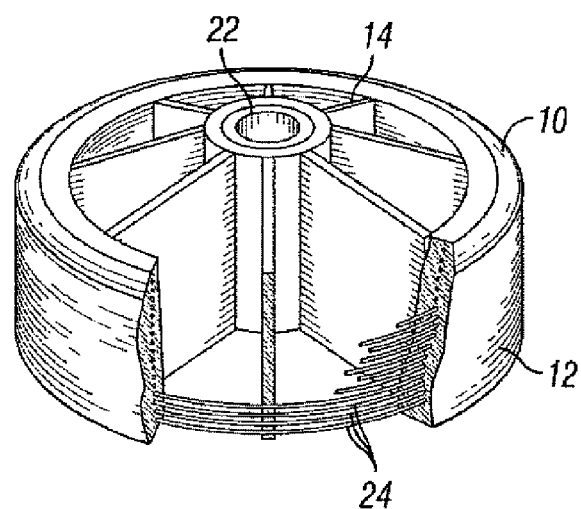

POLYURETHANE

This application claims the benefit of U.S. Provisional Application No. 60/875,948 filed on Dec. 20, 2006.

BACKGROUND OF THE INVENTION

1. Field of the Invention

This invention relates generally to polyurethane and more specifically, to polyurethane formed from reactants that include a dithiodiol and/or a dithiodiamine.

2. Description of the Related Art

Polyurethane is a specialty polymer that is used in a wide variety of commercial applications including, for example, rigid or flexible foams, elastomers, coatings, adhesives and sealants. The chemistry of polyurethane makes use of the reaction of an isocyanate (—N═C═O) with an active hydrogen compound (R—OH) or (R—NH$_2$) to produce the class of polymers known as polyurethane, which includes the group of polyurethane-urea polymers that are produced by the reaction of R—NH$_2$ with the isocyanate.

SUMMARY OF THE INVENTION

Particular embodiments of the present invention include a polyurethane that is a reaction product of reaction components, the reaction components comprising (a) a polyol; (b) a polyisocyanate selected from an aromatic, alicyclic or aliphatic polyisocyanate or combinations thereof; (c) a mixture of chain extenders that includes (i) a chain extender having a sulfur bridge in an amount of between 1 and 30 weight percent of the total mixture of claim extenders and (ii) a main chain extender, wherein the chain extender having a sulfur bridge. The chain extender having a sulfur bridge may be characterized as

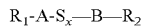

wherein R$_1$ and R$_2$ are selected from an OH, an NH$_2$ or combinations thereof, wherein A and B are selected from a divalent aliphatic, alicyclic or aromatic organic group or combinations thereof, wherein A and B may be the same or different and wherein x is an integer of between 2 and 10.

Particular embodiments of the polyurethane may further include free sulfur and/or a rubber-curing accelerator as reaction components.

Particular embodiments of the polyurethane include foamed polyurethane, coatings, sealants, moldable and/or castable polyurethane.

Particular embodiments further include apparatus comprise any of the polyurethane disclosed herein. Particular embodiments include the polyurethane disposed on at least one surface of a metal substrate. The metal substrate may be a metal reinforcement element selected, for example, from metal wire, metal cord, a metal tire cord, a metal cable, a metal strand, a metal rod, a metal plate, a metal filament or combinations thereof.

In some embodiments, the apparatus may be a conduit, wherein one or more walls of the conduit comprise the polyurethane elastomer of claim 1 and the one or more walls are reinforced with the metal substrate embedded therein. As such, the apparatus may be, for example, a pipe or a hose or even a conveyor belt.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

FIG. 1 is a perspective view of a cast polyester caster having a metal substrate.

DETAILED DESCRIPTION OF PARTICULAR EMBODIMENTS

The present invention provides a polyurethane, methods for making the polyurethane and articles made therefrom as well as methods for making such articles. Particular embodiments of the present invention include a polyurethane that creates strong bonds with metal substrates disposed within or on the surface of the polyurethane. Therefore, particular embodiments of the present invention include articles having a metal substrate with the polyurethane disposed on a surface of the metal substrate. Particular embodiments of such articles include a metal substrate that provides structural support and/or reinforcement of the polyurethane. Particular embodiments of the present invention are also not soluble in water and/or do not easily form an emulsion with water.

Elastomers are a class of polymeric materials that have a high degree of reversible deformation, i.e., a material that can return to its original shape when a deforming or stretching load is removed. Elastomers comprising polymeric materials may typically possess viscoelastic properties. Particular embodiments of the polyurethane have elastomeric properties.

Embodiments of the polyurethane may be used as a coating, as a sealant or as an adhesive. Because the polyurethane bonds well to other materials, the polyurethane is useful in particular embodiments as a sealant, coating and/or adhesive. If a blowing agent is added to particular embodiments of the polyurethane, then articles may be manufactured from the foamed polyurethane. Embodiments further include a polyurethane that is moldable and/or castable.

Embodiments of the polyurethane may be obtained by reacting components that include (1) a polyol, (2) an aromatic, alicyclic or aliphatic polyisocyanate or combinations thereof and (3) a mixture of chain extenders that includes a main chain extender and a sulfur bridge chain extender. The sulfur bridge chain extender may be characterized as a dialcohol having a sulfur bridge, a diamine having a sulfur bridge and/or an amino alcohol having a sulfur bridge. An amino alcohol as used herein is a compound that includes both one alcohol functional group and one amine functional group. The main chain extender makes up the majority of the mixture of chain extenders by weight. In particular embodiments the main chain extender may carry no anionic and/or cationic group and/or may also include no sulfur bridge. The quantity of reaction components added to the reactive mass are, unless otherwise noted, expressed as weight percent based upon the total weight of the polyol reaction component.

A suitable polyol reaction component contains at least two isocyanate-reacting groups that are attached to a single molecule. The molecule may be, for example, a polyester, a polyether, a polycaprolactone, a polypropylene glycol or combinations thereof. In particular embodiments, the polyol may be a hydroxyl-terminated polyol, an amino-terminated polyol or combinations thereof.

A suitable polyol reaction component may be selected, for example, from the polyols that are adequately known in the polyurethane chemistry or combinations thereof. The polyol reaction component of particular embodiments may be characterized as having, for example, a number-average molecular weight of between about 500 and about 20,000 g/mol, between about 600 and about 20,000 g/mol, between about 600 and about 10,000 g/mol, between about 600 and about 7,000 g/mol or between about 600 and about 4000 g/mol.

Examples of a suitable polyol reaction component include polyether polyols, amine-terminated polyols, polyester polyols, polyester ether polyols, castor oil polyols, polycyclic polyols and polycarbonate polyols. Polyether polyols include polytetramethylene ether glycol (PTMEG), polypropylene oxide glycol (PPO) and polybutylene oxide glycol (PBO). Amine-terminated polyols are based on polyether glycols that have had the terminal hydroxyl groups replaced by primary or secondary amino functionalities. The polyester polyols include, for example, polyethylene adipates, polyethyleneglycol adipates, polycaprolactone diols, and polycaprolactone-polyadipate copolymer diols. Many other polyols are available and may be used as known to those skilled in the art. A suitable polyol reaction component may include mixtures of two or more polyols.

A suitable aromatic, alicyclic and/or aliphatic polyisocyanate reaction component may be characterized as a polyisocyanate having two or more aliphatically, alicyclically or aromatically bound isocyanate groups. Suitable polyisocyanates include, for example, the polyisocyanates that are known in polyurethane chemistry or combinations thereof. Suitable aliphatic and alicyclic polyisocyanates include, for example, 1,6-diisocyanatohexane (HDI), 1-isocyanato-5-isocyanatomethyl-3,3,5-trimethylcyclo-hexane (IPDI), bis(4-isocyanatocyclohexyl)methane (H$_{12}$MDI), 1,3-bis-(1-isocyanato-1-methyl-ethyl)benzene (m-TMXDI), mixtures thereof or industrial isomer mixtures of individual aliphatic polyisocyanates.

Suitable aromatic polyisocyanates include, for example, 2,4-toluene diisocyanate (TDI), 4,4'-diphenyl-methane diisocyanate (MDI) and, if appropriate, its higher homologues (polymeric MDI), naphthalene diisocyanate (NDI), polymeric methylene diphenyl diisocyanate (PMDI), mixtures thereof or industrial isomer mixtures of individual aromatic polyisocyanates.

A suitable polyisocyanate reaction component may also include, for example, modified compounds of the polyisocyanate in the form of an allophanate, a biuret, a carbodiimide as well as an oligomer of the isocyanate. Many other polyisocyanates are available and any useful polyisocyanate may be used as known to one having ordinary skill in the art.

The polyisocyanate reaction component may be added to the reaction mass in an amount, for example, of between 10 and 200 weight percent based upon the total weight of the polyol. Particular embodiments may include an amount of polyisocyanate, for example, of between 20 and 150 weight percent, between 35 and 110 weight percent or even between 40 and 100 weight percent based upon the total weight of the polyol.

Particular embodiments of methods for making the polyurethane may include combining the polyol and the polyisocyanate reaction components first to form a prepolymer as known to one having ordinary skill in the art. The prepolymer may then be reacted with the mixture of chain extenders as known to those having ordinary skill in the art. The prepolymer may be made with any polyol or polyisocyanate as disclosed above and may, in particular embodiments, be characterized as having an NCO content of between 1 and 50 percent, between 3 and 40 percent, between 7 and 15 percent or even between 6 and 20 percent.

In addition to the polyol and polyisocyanate reaction components, the reaction mass further includes a mixture of chain extenders that includes a main chain extender and a sulfur bridge chain extender. The main chain extender makes up a majority of the mixture of chain extenders by weight. The mixture of chain extenders may be added in the reaction mass in an amount, for example, of between 1 and 40 weight percent based upon the total weight of the polyol. Particular embodiments may include an amount of the mixture of chain extenders, for example, of between 2 and 30 weight percent, between 4 and 20 weight percent or even between 5 and 15 weight percent based upon the total weight of the polyol.

A suitable sulfur bridge chain extender reaction component is a dialcohol having a sulfur bridge, a diamine having a sulfur bridge and/or an amino alcohol having a sulfur bridge characterized by the following formula (1):

$$R_1\text{-A-S}_x\text{—B—}R_2 \qquad (1)$$

wherein $R_1$ and $R_2$ are selected from an OH, an $NH_2$ or a combination thereof (as in the case of an amino alcohol), wherein A and B are selected from a divalent aliphatic, alicyclic or aromatic organic group or combinations thereof and wherein x is an integer between about 2 and 10. In particular embodiments, x is an integer between 2 and 10, between 2 and 8 or between 2 and 5. A and B may be the same or different.

The sulfur bridge chain extender may be added to the reaction mass in an amount, for example, of at least 0.5 weight percent but no more than 30 weight percent based upon the total weight of the mixture of chain extenders. Particular embodiments may include an amount of the sulfur bridge chain extender, for example, of between 1 and 30 weight percent, of between 2 and 25 weight percent, of between 3 and 23 weight percent, of between 4 and 20 weight percent or even between 5 and 15 weight percent based on the total weight of the mixture of chain extenders.

Particular embodiments of the present invention may include the dialcohol 2,2'-dithiodiethanol or the diamine 4,4-dithiodianiline as the sulfur bridge chain extender. Both of these compounds conform to the general formula (1) above with A and B both being $C_2H_4$ or $C_6H_4$ respectively and x being 2. Particular embodiments of the polyurethane include both A and B of formula (1) being straight-chained alkyl groups. Other embodiments include both A and B of formula (1) being alicyclic and/or aromatic moieties and/or straight-chained alkyl moieties and/or wherein A and B may be the same or different.

Other examples of compounds having the general formula (1) include hydroxyalkyldi(tri, tetra, or penta)sulfides such as bis(hydroxymethyl)disulfide, bis(hydroxymethyl)trisulfide, bis(hydroxymethyl) tetrasulfide, bis(hydroxymethyl)-pentasulfide, bis(2-hydroxyethyl)disulfide, bis(2-hydroxyethyl) trisulfide, bis(2-hydroxyethyl) tetrasulfide, bis(2-hydroxyethyl)pentasulfide, bis(3-hydroxypropyl)disulfide, bis(3-hydroxy-propylitrisulfide, bis(3-hydroxypropyl)tetrasulfide, bis(2-hydroxypropyl)disulfide, bis(2-hydroxypropyl)trisulfide, bis(2-hydroxypropyl)tetrasulfide, bis(4-hydroxybutyl) disulfide, bis(4-hydroxybutyl) trisulfide, bis(4-hydroxybutyl)tetrasulfide, bis(8-hydroxyoctyl)disulfide, bis(8-hydroxyoctyl)trisulfide, bis(8-hydroxyoctyl)tetrasulfide and the like, and ethylene oxide or propylene oxide adducts of the aforementioned hydroxyalkyldi(tri, tetra, or penta)sulfides; di(2-hydroxyethyl)esters (ethylene oxide adducts) or di(hydroxypropyl)esters (propylene oxide adducts) or the like of di(tri or tetra)sulfidodicarboxylic acids such as 2,2'-dithiodiglycolic acid, 2,2'-trithiodiglycolic acid, 2,2'-tetrathiodiglycolic acid, 3,3'-dithiodipropionic acid, 3,3'-trithiodipropionic acid, 3,3'-tetrathiodipropionic acid, 3,3'-pentathio-dipropionic acid, 4,4'-dithiodibutanoic acid, 4'-trithiodibutanoic acid, 4,4'-tetrathiodibutanoic acid, 8,8'-dithiodioctanoic acid, 8,8'-trithiodioctanoic acid, 8,8'-tetrathiodioctanoic acid, 3,3' dihydroxydiphenyl disulfide, 3,3' dihydroxydiphenyl trisulfide, 3,3' dihydroxydiphenyl disulfide, 3,3' dihydroxydiphenyl tetrasulfide and the like.

Other examples of compounds having the general formula (1) wherein $R_1$ and $R_2$ are an $NH_2$ moiety include 4,4' dianiline disulfide, 4,4' dianiline trisulfide, 4,4' dianiline tetrasulfide, 2,2' dianiline disulfide, 2,2' dianiline trisulfide, 2,2' dianiline tetrasulfide and the like.

Examples of compounds having the general formula (1) wherein $R_1$ and $R_2$ are different include the amino alcohols 1,2 aminoethanol, 1,3' amino propanol and 1,4 amino butanol.

The main chain extender of the mixture of chain extenders does not contain a sulfur bridge as characterized in formula (1) above. The main chain extender does make up the majority of the mixture of chain extenders by weight. A suitable main chain extender reaction component may be selected from the curatives that are known in the polyurethane chemistry or combinations thereof. In particular embodiments, the main chain extender may be characterized as carrying no anionic and/or cationic group.

In particular embodiments, the main chain extender may be an aliphatic, alicyclic and/or aromatic selected from a polyalcohol, a polyamine or combinations thereof. Furthermore, in some embodiments the main chain extender may be characterized as being a short-chained dialcohol, a short-chained diamine or combinations thereof. Embodiments of the polyurethane may include a di-, tri-, and/or tetra-alcohol and/or amine but typically a diol or a diamine is selected as the second chain extender.

Examples of suitable short-chained chain extenders include, for example, 1,2, ethanediol, 1,2 propanediol, 1,2 butanediol, ethylene diamine, 1,2 propane diamine, propylene diamine, propylenediol, 4,4'-methylene bis-(3-chloro-2, 6-diethylaniline) (MCDEA), 4,4'-methylene bis(2-chloroaniline) (MOCA), diethylthiotoluenediamine (DETDA) and dimethylthiotoluenediamine (DMTDA). A suitable second chain extender reaction component is available commercially from Albermarle Corporation as ETHACURE 300, which comprises DMTDA and has a reported molecular weight of 214 g/mol. However, any chain extender that is known to those having ordinary skill in the polyurethane art may be used if the second chain extender provides a polyurethane composition having the properties desired for a given application. A short-chained chain extender has a number-average molecular weight of between 60 and 600 g/mol.

Particular embodiments of the present invention may further include sulfur and/or a curing accelerator. Adding sulfur and/or a curing accelerator increases the bonding strength of the polyurethane to a metal substrate in particular embodiments.

Suitable sulfur includes pulverized sulfur, rubber maker's sulfur, commercial sulfur and insoluble sulfur. In particular embodiments, the sulfur may be added to the reactant mass in an amount of between 0.5 and 10 weight percent of the polyol or in an amount such that the number of moles of sulfur added is between 90 and 110 mole percent of the total number of moles of the sulfur bridge chain extender.

Suitable curing accelerators may be selected from those that are known as curing accelerators for rubber. In particular embodiments, the curing accelerator may be added to the reactant mass in an amount of between 0.5 and 10 weight percent of the polyol or in an amount such that the number of moles of the curing accelerator added is between 90 and 110 mole percent of the total number of moles of the sulfur bridge chain extender.

One classification of rubber-curing accelerators is as follows:

TABLE 1

| Rubber-Curing Accelerator Classification | | |
|---|---|---|
| Type | Time at 284° F. | Examples |
| Moderately fast | Circa 60 min | Diphenylguanidine Hexamethylene tetramine |
| Fast | Circa 30 min | Mercaptobenzothiazole Benzothiazyl disulfide |
| Ultra-accelerators | Several minutes | Thiurams Dithiocarbamates Xanthates |

H. L. Stephans in "The Compounding and Vulcanization of Rubber", Chapter 2, Rubber Technology 3$^{rd}$ edition, edited by Maurice Morton, 1987, incorporated herein by reference.

Examples of dithiocarbamate accelerators include zinc dibenzyl dithiocarbamate (ZBEC—CAS No. 14726-36-4), zinc-N-dimethyl-dithiocarbamate (ZDMC), zinc-N-diethyldithiocarbamate (ZDEC—CAS No. 14323-55-1), zinc-N-dibutyl-dithiocarbamate (ZDBC—CAS No. 35884-05-0), zinc-N-ethylphenyl-dithiocarbamate (ZEBC—CAS No. 14364-93-6), zinc-N-pentamethylene dithiocarbamate (ZPMC—CAS No. 13878-54-1), piperidinium pentamethylene dithiocarbamate (CAS No. 98-77-1), sodium diethyl dithiocarbamate (CAS No. 148-18-5); bismuth dimethyl dithiocarbamate (CAS No. 21260-46-8); cadnmium diethyl dithiocarbamate (CAS No. 14239-68-0); copper dibutyl dithiocarbamate (CAS No. 13927-71-4); copper dimethyl dithiocarbamate (CAS No. 137-29-1); cyclohexylethylammonium cyclohexyl ethyl dithiocarbamate; dimethylammonium dimethyl dithiocarbamate (CAS No. 598-64-1); dimethylcyclohexylammonium dibutyl dithiocarbamate (CAS No. 149-82-6); lead diamyl dithiocarbamate (36501-84-5); lead dimethyl dithiocarbamate (CAS No. 19010-66-3); CAS No. 72146-43-1; CAS 72146-41-9; CAS No. 72146-42-0; nickel di-isobutyl dithiocarbamate (CAS No. 15317-78-9); nickel dibutyl dithiocarbamate (CAS No. 13927-77-0); nickel dimethyl dithiocarbamate (CAS No. 15521-65-0); N-oxydiethylenethiocarbamyl-N'oxydiethylenesulfenamide (CAS No. 13752-51-7); potassium di-methyl dithiocarbamate (CAS No. 128-03-0); selenium diethyl dithiocarbamate (CAS No. 5456-28-0); selenium dimethyl dithiocarbamate (CAS No. 144-34-3); sodium cyclohexylethyl dithiocarbamate; sodium dibenzyl dithiocarbamate (CAS No. 55310-46-8); sodium dibutyl dithiocarbamate (CAS No. 136-30-1); sodium dimethyl dithiocarbamate (CAS No. 128-04-1); disodium ethylene-bis-dithiocarbamate; sodium diisobutyl dithiocarbamate (CAS No. 2219-18-3); tellurium diethyldithiocarbamate (CAS No. 20941-65-5); zinc diamyl dithiocarbamate (CAS No. 15337-18-5); zinc dibutyl dithiocarbamate (CAS No. 136-23-2); zinc diisobutyl dithiocarbamate (CAS No. 36190-62-2); zinc dimethyl dithiocarbamate (CAS No. 137-30-4); N,N dimethyl cyclohexyl ammonium dithiocarbamate; 2,2'-dithiodo (ethylammonium) bis(dibenzyl dithiocarbamate).

Examples of thiuram accelerators include tetramethylthiuram monosulphide (TMTM), tetramethylthiuram disulphide, tetraethylthiuram disulfide (TETD), tetrabenzylthiuram disulfide (TBzTD). Examples of xanthate accelerators include zinc isopropyl xanthate (ZIX), sodium isopropyl xanthate (SIX), zinc butyl xanthate (ZBX), dibutyl xanthogen disulfide, diethyl xanthogenate, diisopropyl xanthogen disulfide, diusobutyl xanthogen disulfide.

Examples of dithiophosphate accelerators include copper diisopropyl dithiophosphate, zinc-O—,O-di-n-butylphosphorodithioate.

Examples of other suitable accelerators include thiazoles, sulphenamides, guanidines, thiourea derivatives, amine derivatives, and combinations thereof. These include, but are not limited to a zinc or sodium salt of 2-mercaptobenzothiazole (ZMBT), diphenyl guanidine (DPG), triphenyl guanidine (TPG), diorthotolyl guanidine (DOTG), o-tolylbigaunide (OTBG), ethylene thiourea (ETU), diethylthiourea (DETU), diphenyl thiourea (DPTU), benzothiazole disulfide (MBTS) and hexamethylene tetramine (HMT).

Selection of the reaction components used to produce particular embodiments of the polyurethane composition of the present invention are dependent upon the particular application and desired characteristics of the polyurethane. Each of the reaction components affects the physical properties of the resulting polyurethane composition as well as, for example, reaction times that affect the process of making the polyurethane. Such selections are made by methods well known to those having ordinary skill in the art and are not a part of the present invention.

Particular embodiments of the present invention may include other components as known to those having ordinary skill in the art. Such components may include, for example, catalysts, colorants, stabilizers against heat and/or UV radiation, antioxidants and combinations thereof.

Particular embodiments of the present invention are not soluble in water. "Not soluble" is used herein as one having ordinary skill in the art would interpret the phrase; i.e., difficult or incapable of being dissolved in water. Therefore, particular embodiments of the present invention include a second chain extender that carries no anionic and/or no cationic group.

Particular embodiments of the present invention further provide articles made of polyurethanes obtained by reaction of reaction components that include a polyisocyanate selected from an aromatic, alicyclic or aliphatic polyisocyanate or combinations thereof as well as a polyol and a dialcohol having a sulfur bridge as described above in formula (1). Particular embodiments may further provide articles made by reaction of an additional reaction component that is a curative. The curative may further be characterized in some embodiments as carrying no anionic and/or cationic group. Particular embodiments further include a metal substrate having at least one surface on which the polyurethane adheres. Such substrates may be for decorative purposes but are more typically useful as structural support and/or reinforcement of the polyurethane article.

Polyurethane articles can be reinforced with a metal substrate. The metal substrate may be on the surface of the polyurethane but typically the metal substrate is embedded in the polyurethane. While not limiting the invention, metals that are useful as metal substrates include, for example, steel, copper, tin, brass, nickel, vanadium, aluminum and alloys thereof. The metal substrates may also be coated with other metals such as, for example, brass-coated steel.

Many terms are used to describe metal substrates used to decorate, strengthen, support and/or reinforce polyurethane articles. The terms cord, tire cord, cable, strand, wire, rod, plate and filament can all be used to describe metal reinforcing elements used to strengthen polyurethane articles. The term metal reinforcement as used herein is generic to all articles for reinforcing polyurethane articles including those listed above. Thus, without being limited thereto, a metal reinforcement can be metal wire, metal cord, a metal tire cord, a metal cable, a metal strand, a metal rod, a metal plate, a metal filament or combinations thereof. Likewise, decorative metal substrates may include, without limitation, a metal rod, a metal strand, a metal plate, a metal sphere or combinations thereof.

One such polyurethane article having a metal substrate support is a caster suitable for support and movement of, for example, furniture, trucks, and portable equipment. FIG. 1 is a perspective view of an exemplary caster in accordance to the present invention. The caster 10 is made of polyurethane obtained from reaction components that include a dialcohol having a sulfur bridge and other reactants as described above. The caster 10 includes spokes 14 and a rim 12 that are molded around a hub 22. The hub 22 includes a hearings housing 16. The caster 10 further includes metal reinforcing wires 24 embedded in the rim 12. The caster 10 is molded around the reinforcing wires 24 by methods well known to one having ordinary skill in the art.

Methods for making the polyurethane are well known by one having ordinary skill and include both one shot methods and the prepolymer methods as known to one having ordinary skill in the art. The methods further include foaming for the production of a foamed polyurethane. Foaming agents may be added as known to one having ordinary skill in the art to produce a foamed polyurethane.

The invention is further illustrated by the following examples, which are to be regarded only as illustrations and not delimitative of the invention in any way.

Example 1

The prepolymer method was used to produce several samples of the polyurethane. The quantities and ingredients are shown in Table 2. The quantity of each reaction component added is expressed as weight percent based upon the total weight of the prepolymer.

TABLE 2

| | Polyurethane Mixes | | | | | | |
|---|---|---|---|---|---|---|---|
| | 1 | 2 | 3 | 4 | 5 | 6 | 7 |
| VIBRATHANE B-836 (PP) | 100 | 100 | 100 | 100 | 100 | 100 | 100 |
| 1,4 Butanediol (BDO) | 9.39 | 9.51 | 9.04 | 9.04 | 9.04 | 9.04 | 8.53 |
| 2,2'-dithiodiethanol | | | 0.81 | 0.81 | 0.81 | 0.81 | |
| 4,4' Dithiodianiline | | | | | | | 2.62 |
| sulfur | | | | | 1.36 | 1.36 | 2.70 |
| diphenyl guanidine (DPG) | | | | 0.06 | 0.06 | | 0.12 |
| Titanium Catalyst (mg/100 g PP) | | 1 | 1 | 1 | 1 | 1 | 1 |
| CoCure 55 (mg/100 g PP) | 110 mg | | | | | | |
| DABCO Catalyst (mg/100 g PP) | 22 | 0.3 | 0.3 | 0.3 | 0.3 | 0.3 | 0.3 |
| Adhesive applied to cables | Y | N | N | N | N | N | N |

Pullout Test Results - Maximum Pullout Force, N

TABLE 2-continued

| | Polyurethane Mixes | | | | | | |
|---|---|---|---|---|---|---|---|
| | 1 | 2 | 3 | 4 | 5 | 6 | 7 |
| Brass Cables | | 352 | 678 | 543 | 787 | 566 | 501 |
| Steel Cables | 374 | 443 | 433 | 305 | 805 | 680 | 543 |

The prepolymer was VIBRATHANE B-836, a prepolymer based on a polyether and MDI and available from Chemtura. The titanium catalyst was available from VERTEC. The COCURE 55 is an organomercurial catalyst available from Rutherford Chemicals of New Jersey. The DABCO catalyst is known as trimethylene diamine catalyst. CONAP 1146 is commercially available from Cytec Industries as a high strength adhesive for bonding liquid urethanes to a substrate during the curing process.

The 1,4 Butanediol (BDO) was the main chain extender while the 2,2'-dithiodiethanol and the 4,4' dithiodianiline were sulfur bridge chain extenders.

If used for the particular mix, the titanium and DABCO catalysts were added to the BDO before mixing with the prepolymer. If used, the DPG and the sulfur bridge chain extenders were added to the BDO before mixing with the prepolymer.

The prepolymer was heated to about 70° C. and degassed for approximately 10 minutes under reduced pressure. The elemental sulfur, if used, was added and mixed under the reduced pressure until a majority of the sulfur was dissolved. The BDO mixture was then added to the prepolymer and mixed together for 15-60 seconds. The mixture was then poured into a mold.

The mold cavity dimensions were 12.5 mm×12.5 mm×200 mm. The pullout mold had 15 slots and approximately 6.25 mm in depth. The slots were orthogonal to the mold cavity. Metal cables were placed in the slots before the polyurethane mixture was poured into the molds.

The polyurethane was cured in the molds as the mold was heated for 30 minutes at 150° C. The composite was demolded, placed in an oven and post cured overnight at 100° C. Preferably, the polyurethane block should be allowed to post cure at room temperature for a minimum of 7 days.

Example 2

Metallic cables were prepared for placing in the mold slots as described in Example 1. The cables that were used were standard tire cables approximately 1 mm in diameter. One set of cables was coated with brass and the second set of cables had the brass coating removed to expose the steel underneath.

The cables were cleaned with ethyl acetate to remove oil from the surface. Using the manufacturer's recommendation, the CONAP 1146 adhesive was applied to the cable surface and heated if applicable for the witness test above in Example 1.

Example 3

The cured samples of Example 1 were tested using a pullout procedure similar to the ASTM D 2229 method for testing rubber/tire cable adhesion. An INSTRON 5500R with a 5 kN load cell was used to pull the cables out of the cured polyurethane block. Standard INSTRON clamps (catalogue no. 2712-017) were used to grip the metallic cables. For all tests, a 50 mm gage length and displacement rate of 100 mm/min was used. The pullout forces are reported in Table 1 in Newtons (N).

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A polyurethane that is a reaction product of reaction components, the reaction components comprising:
    (a) a polyol;
    (b) a polyisocyanate selected from an aromatic, alicyclic or aliphatic polyisocyanate or combinations thereof;
    (c) a mixture of chain extenders that includes (i) a chain extender having a sulfur bridge in an amount of between 1 and 30 weight percent of the total mixture of claim extenders and (ii) a main chain extender, wherein the chain extender having a sulfur bridge is characterized as R1-A-Sx-B—R2 wherein R1 and R2 are selected from an OH, an NH2 or combinations thereof, wherein A and B are selected from a divalent aliphatic, alicyclic or aromatic organic group or combinations thereof, wherein A and B may be the same or different and wherein x is an integer of between 2 and 10; and
    (d) free sulfur in an amount of between 0.5 and 10 wt. % of the polyol.

2. The polyurethane of claim 1, wherein a number of moles of the free sulfur is between 90 mole % and 110 mole % of a total number of moles of the chain extender having a sulfur bridge.

3. The polyurethane of claim 1, wherein the reaction components further comprise a rubber-curing accelerator.

4. The polyurethane of claim 3, wherein the rubber-curing accelerator is diphenyl guanidine.

5. The polyurethane of claim 1, wherein the main chain extender carries no group selected from a cationic group, an anionic group or combinations thereof.

6. The polyurethane of claim 1, wherein the main chain extender is a short-chained chain extender selected from a dialcohol, a diamine or combinations thereof.

7. The polyurethane of claim 1, wherein the main chain extender is selected from 1,2-ethanediol, 1,2-propanediol, 1,2-butanediol, ethylene diamine, 1,2-propane diamine, propylene diamine, propylenediol, 4,4'-methylene bis-(3-chloro-2,6-diethylaniline) (MCDEA), 4,4'-methylene bis(2-chloroaniline) (MOCA), diethylthiotoluenediamine (DETDA) and dimethylthiotoluenediamine (DMTDA) or combinations thereof.

8. The polyurethane of claim 1, wherein x is an integer between 2 and 5.

9. The polyurethane of claim 1, wherein the mixture of chain extenders includes the chain extender having a sulfur bridge in an amount of between 2 and 25 weight percent of the total mixture of chain extenders.

10. The polyurethane of claim 1, wherein the mixture of chain extenders includes the chain extender having a sulfur bridge in an amount of between 5 and 15 weight percent of the total mixture of chain extenders.

11. The polyurethane of claim 1, wherein the polyisocyanate is a diisocyanate.

12. The polyurethane of claim 1, wherein the chain extender having a sulfur bridge is selected from 2,2-dithiodiethanol, 4,4-dithiodianiline or combinations thereof.

13. The polyurethane of claim 1, wherein the polyurethane is moldable.

14. An apparatus, comprising:
the polyurethane of claim 1 disposed on at least one surface of a metal substrate.

15. The apparatus of claim 14, wherein a number of moles of the free sulfur is between 90 mole % and 110 mole % of a total number of moles of the chain extender having a sulfur bridge.

16. The apparatus of claim 14, wherein the metal substrate is a metal reinforcement element selected from metal wire, metal cord, a metal tire cord, a metal cable, a metal strand, a metal rod, a metal plate, a metal filament or combinations thereof.

17. The apparatus of claim 14, wherein the reaction components further comprise a rubber-curing accelerator.

18. The apparatus of claim 14, wherein the apparatus is a caster.

19. The polyurethane of claim 3, wherein a number of moles of the rubber-curing accelerator is between 90 mole % and 110 mole % of a total number of moles of the chain extender having a sulfur bridge.

20. The apparatus of claim 17, wherein a number of moles of the rubber-curing accelerator is between 90 mole % and 110 mole % of a total number of moles of the chain extender having a sulfur bridge.

21. The apparatus of claim 17, wherein the rubber-curing accelerator is diphenyl guanidine.

* * * * *